United States Patent
Aspler Yaskil et al.

(10) Patent No.: US 12,395,354 B1
(45) Date of Patent: Aug. 19, 2025

(54) MULTI-LAYERED VERIFICATION OF DIGITAL APPEARANCES

(71) Applicant: AU10TIX Ltd., Hod Hasharon (IL)

(72) Inventors: Rivka Aspler Yaskil, Hod Hasharon (IL); Michael Levy, Modiin (IL); Udi Abram, Herzliya (IL); Ron Atzmon, Tel Aviv (IL)

(73) Assignee: AU10TIX LTD., Hod Hasharon (IL)

( * ) Notice: Subject to any disclaimer, the term of this patent is extended or adjusted under 35 U.S.C. 154(b) by 0 days.

(21) Appl. No.: 19/017,845

(22) Filed: Jan. 13, 2025

(51) Int. Cl.
*H04L 9/40* (2022.01)
*H04L 9/32* (2006.01)

(52) U.S. Cl.
CPC .................. *H04L 9/3247* (2013.01)

(58) Field of Classification Search
CPC .................................................. H04L 9/3247
See application file for complete search history.

(56) References Cited

U.S. PATENT DOCUMENTS

| | | | | |
|---|---|---|---|---|
| 8,806,625 B1* | 8/2014 | Berger | ................. | H04L 9/3247 726/13 |
| 10,162,850 B1* | 12/2018 | Jain | ......................... | G06F 40/30 |
| 10,445,609 B1 | 10/2019 | Jain et al. | | |
| 10,949,852 B1* | 3/2021 | Kramme | ............. | G06Q 20/409 |
| 11,532,183 B1 | 12/2022 | Antrim et al. | | |
| 11,625,470 B2* | 4/2023 | Diehl | ....................... | H04L 9/30 713/158 |
| RE49,968 E* | 5/2024 | Ebrahimi | .............. | H04L 9/3247 |
| 2006/0242423 A1* | 10/2006 | Kussmaul | ............. | H04L 9/3247 713/182 |
| 2011/0055579 A1* | 3/2011 | Cohen | .................. | H04L 9/3247 713/168 |
| 2014/0180981 A1 | 6/2014 | Dolev et al. | | |
| 2014/0254893 A1 | 9/2014 | Phillips et al. | | |
| 2015/0378317 A1* | 12/2015 | Liu | ........................ | G04F 10/00 702/176 |
| 2019/0342096 A1 | 11/2019 | Starosielsky et al. | | |
| 2020/0311682 A1 | 10/2020 | Olshansky | | |
| 2020/0366671 A1* | 11/2020 | Larson | .................... | G06F 9/451 |

(Continued)

FOREIGN PATENT DOCUMENTS

CN 113269187 A 8/2021

*Primary Examiner* — Ghodrat Jamshidi
(74) *Attorney, Agent, or Firm* — S. J. Intellectual Property Limited

(57) ABSTRACT

A system for determining if an image of an ID was issued as a cryptographically signed ID and validating the ID, the system comprising a processing circuitry configured to: obtain: (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and (B) a given image of a given ID; determine, using the machine learning model and the given image, if the given ID was issued as a cryptographically signed ID or not; and upon determining that the given ID was issued as a cryptographically signed ID, employ one or more verification modules on the given image to determine validity of the given ID.

20 Claims, 4 Drawing Sheets

(56) References Cited

U.S. PATENT DOCUMENTS

| | | | |
|---|---|---|---|
| 2020/0374129 A1 | 11/2020 | Dilles et al. | |
| 2020/0410074 A1 | 12/2020 | Dang et al. | |
| 2021/0064900 A1 | 3/2021 | Vorobiev et al. | |
| 2021/0124919 A1 | 4/2021 | Balakrishnan et al. | |
| 2021/0126773 A1* | 4/2021 | Perlman | G06F 16/27 |
| 2021/0312399 A1 | 10/2021 | Asokan et al. | |
| 2021/0326433 A1* | 10/2021 | Sly | G06V 10/7715 |
| 2021/0358068 A1 | 11/2021 | Boszczyk et al. | |
| 2022/0121765 A1* | 4/2022 | Foong | G06F 21/64 |
| 2022/0217001 A1* | 7/2022 | Dhanabalan | H04L 9/088 |
| 2022/0277066 A1 | 9/2022 | Levine et al. | |
| 2023/0013380 A1 | 1/2023 | Choi et al. | |
| 2023/0326225 A1* | 10/2023 | Hron, II | G06V 30/1456 |
| 2023/0350988 A1* | 11/2023 | Bae | G06F 21/31 |
| 2025/0022382 A1* | 1/2025 | Porsborg | G06T 11/00 |
| 2025/0028859 A1* | 1/2025 | Huver | G06F 21/6254 |

\* cited by examiner

MULTI-LAYERED VERIFICATION OF DIGITAL APPEARANCES

TECHNICAL FIELD

The present invention relates to the field of a system and method for determining if an image of an ID was issued as a cryptographically signed ID and validating the ID.

BACKGROUND

A cryptographically signed document is a digital file that has been "signed" using cryptographic algorithms to guarantee authenticity, integrity, and non-repudiation. In simpler terms, it proves that the document truly originated from a specific signer, that it has not been modified since it was signed, and that the signer cannot later deny having signed it, nor any fraudulent user can change the personal data identifiers (PII) that have been cryptographically signed.

The flow of signing a signed identifier from the end-user perspective involves several precise technical steps that include key generation, cryptographic signing, and interaction with the verifier via an infrastructure, a centralized or a decentralized one.

Following is a detailed technical description of the process, using two possible infrastructures: decentralized and centralized. When the identifier and the infrastructure are decentralized-Decentralized IDentifier (DID), the following steps would be taken:

1) Key Pair Generation—Private and Public Key Creation: The end-user begins by generating a cryptographic key pair. This involves creating a private key, which remains securely stored on the user's device.
2) Algorithm Specification: The key pair is typically generated using a secure cryptographic algorithm, such as Elliptic Curve Digital Signature Algorithm (ECDSA) or Edwards-Curve Digital Signature Algorithm (EdDSA). Entropy Source: The generation relies on a robust source of entropy, such as the device's cryptographic random number generator (RNG).
3) DID Document Creation—DID Document Construction: The DID Document is created to associate the DID with the public key. This document typically contains: The unique identifier (did: <namespace>: <unique-string>); Public key information, including the key type (e.g., Ed25519) and encoding format (e.g., base58 or JWK) and additional metadata such as service endpoints or authentication mechanisms.
4) Signing the DID Document, using the following steps:
   Canonicalization: The DID Document is converted into a canonical form (e.g., using JSON-LD Canonicalization if the DID is JSON-LD based). This ensures that the document's structure is deterministic and verifiable.
   Hashing: The canonicalized document is hashed using a cryptographic hash function, such as SHA-256, to produce a digest. This step ensures data integrity and creates a fixed-length representation of the document.
   Digital Signature Creation: The end-user applies their private key to sign the hash of the DID Document, generating a digital signature. The signature is created using the previously chosen algorithm (e.g., ECDSA or EdDSA).
5) DID Publication—The signed DID and associated DID Document are submitted to the underlying DID registry or ledger.

When the identifier and the infrastructure are centralized, the following steps will be taken:
1) Key Pair Generation—The end-user's device generates a cryptographic key pair using algorithms like RSA (e.g., 2048 or 4096-bit keys) or ECDSA (e.g., P-256, P-384 curves). Alternatively, the centralized infrastructure might generate the key pair server-side and securely distribute the private key to the user.
2) Certificate Signing Request (CSR)—The end-user's application (e.g., a client-side application or web interface) creates a CSR. The CSR is signed by the user's private key to prove possession of the key.
3) Submission to CA: The CSR is transmitted to a centralized Certificate Authority (CA) for validation.
4) Signing and Verification: The user employs their private key to sign data. This involves: hashing the data using a secure hash algorithm (e.g., SHA-256) and then encrypting the hash with the private key to produce a digital signature.

A related concept is the use of digitally or cryptographically signed identifications (IDs), which are electronic credentials containing identifying information (such as: a name, date of birth, organizational affiliation, etc.) that are digitally signed by a trusted authority. Much like signing a document, a trusted authority (for instance, a government agency or a recognized certificate authority) uses its private key to produce a signature that validates the authenticity of the ID. When the validation system needs to confirm that the ID is legitimate, it verifies the signature with the authority's public key. This ensures that the identity attributes have not been altered and that they indeed originate from the trusted authority.

Cryptographically signed documents and IDs carry several important benefits. They offer robust integrity by making forgery and undetected modification extremely difficult. In many countries and industries, digital signatures and digitally signed IDs are legally recognized and compliant with regulations, providing the same legal standing as traditional, handwritten signatures. Additionally, they are more efficient, saving both time and resources compared to manual processes, as they can be issued, exchanged, and verified online in seconds.

The transmission of identifiers, whether in centralized or decentralized systems, relies on a variety of methods that facilitate secure and efficient exchange of data. These methods are designed to support a range of use cases, from personal authentication to secure communication between devices, while accommodating the differing architectures of centralized and decentralized systems.

In both centralized and decentralized systems, identifiers are transmitted using methods like Near-Field Communication (NFC), Quick Response (QR) codes, Bluetooth Low Energy (BLE), URLs, encrypted payloads over networks, and physical media. Each method offers unique advantages and trade-offs based on the infrastructure, level of security, and user convenience.

NFC is a popular method for transmitting identifiers in localized, secure environments. It allows a user to store an identifier—such as a Decentralized Identifier (DID) or a certificate issued by a centralized authority—on an embedded chip, which can be transmitted wirelessly to a reader when brought into close proximity. NFC is widely used for authentication in access control systems, contactless payments, and secure device pairing. While NFC is simple and fast, it requires specialized hardware and is limited to short-range communication, typically within a few centimeters.

QR codes are another widely used method for identifier transmission. By encoding the identifier (e.g., DID, email address, or certificate data) into a scannable image, QR codes allow users to transmit identifiers quickly and conveniently. In decentralized systems, a QR code might contain a DID or a cryptographic proof of identity, while in centralized systems, it could represent a link to a central database or a one-time-use token. QR codes are accessible to nearly all devices equipped with cameras, making them a practical choice for physical or digital interactions. However, precautions must be taken to secure the content of the QR code, especially when used in public settings.

Bluetooth Low Energy (BLE) enables wireless transmission of identifiers over short distances, often within a range of up to 100 meters. This method is commonly used in wearable devices, IoT systems, and secure device pairing scenarios. In decentralized systems, BLE can facilitate direct peer-to-peer transmission of cryptographic identifiers like DIDs. In centralized contexts, it can transmit authentication tokens or credentials issued by a central authority. BLE is efficient and versatile but may require additional security measures such as pairing to prevent unauthorized access.

URLs or URIs Identifiers can also be transmitted as URLs or URIs, which are especially useful in web-based interactions. For example, in a decentralized system, a URL might point to a DID resolver that retrieves the DID Document, while in a centralized system, it could link to a user's profile or an API endpoint managed by a central authority. This method is particularly convenient for integrating identity systems into existing web infrastructures, although it relies on secure network protocols (e.g., HTTPS) to protect the transmission from man-in-the-middle attacks.

Encrypted Payloads Over Networks Encrypted payloads are a robust method for transmitting identifiers securely over networks. In this approach, the identifier is encapsulated within an encrypted payload and transmitted using protocols like HTTPS, Wi-Fi, cellular data, or peer-to-peer systems. Decentralized systems might use protocols such as DIDComm or IPFS to securely exchange DIDs and associated metadata, while centralized systems often rely on standard PKI-based methods to transmit certificates or authentication tokens. This method ensures data confidentiality and integrity but typically requires internet connectivity and may involve computational overhead for encryption and decryption.

Physical Media Physical media, such as smartcards, USB drives, or printed materials, offer a secure offline option for transmitting identifiers. A decentralized system might store a DID or a private key on a smartcard, while centralized systems frequently use similar media to store X.509 certificates or access tokens. These methods are effective in environments where digital communication channels are unavailable or where offline security is a priority. However, physical media can be lost or stolen, necessitating proper safeguards.

Contextual Applications While the methods for transmitting identifiers are similar in both centralized and decentralized systems, the key difference lies in how these identifiers are verified. In decentralized systems, verification often involves cryptographic proofs using public-private key pairs and querying distributed ledgers or peer-to-peer networks. For centralized systems, verification typically relies on a trusted central authority, such as a Certificate Authority (CA) or an identity provider (IdP), which issues and manages the identifiers.

In both architectures, identifiers might also be embedded in Verifiable Credentials or Verifiable Presentations, adding a layer of context and cryptographic validation. These credentials can be transmitted via email, messaging apps, or wallet-to-wallet protocols, enabling seamless interoperability across different platforms.

In many modern applications, the cryptographic information is conveyed using JavaScript Object Notation (JSON)-based formats, such as: JSON Web Signatures (JWS) or other structures defined by the JOSE (JSON Object Signing and Encryption) standards. This allows for easy integration with web services and Application Programming Interfaces (APIs), as JSON is a common format for data exchange. The core idea remains the same: the hash of the document is signed by the private key, and the resulting signature associated with the document is sent or stored alongside the document in a standardized, machine-readable structure.

Despite the widespread adoption of digital signatures and electronically verified IDs, many modern verification systems still encounter an important yet often overlooked limitation. Specifically, individuals may mistakenly attempt to verify their cryptographically signed documents or IDs by providing an image-such as a photograph, screenshot, or other certificate-less representations-instead of the actual signed document or the JSON associated with the signed document. While this image can capture the general visual appearance of the document or ID, it omits crucial cryptographic data, including the embedded signature and other security attributes. As a result, current verification platforms are unable to authenticate it and automatically reject the user's submission. This disconnect not only causes inconvenience for those trying to prove their identity or document legitimacy, but it also underscores a more fundamental need within the industry: a novel technique for verifying these image-based representations of cryptographically signed documents or IDs. Providing such a method would extend the utility of digital signatures to situations where only an image file or a certificate-less document is available, bridging the gap in current verification practices and ensuring that legitimate credentials can be validated swiftly and securely even when presented in non-original formats.

Thus, there is a need for a novel technique for a system and method for validating an image of a document and/or an ID that were issued as a cryptographically signed document and/or as a cryptographically signed ID.

GENERAL DESCRIPTION

In accordance with a first aspect of the presently disclosed subject matter, there is provided a system for determining if an image of an ID was issued as a cryptographically signed ID and validating the ID, the system comprising a processing circuitry configured to: obtain: (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and (B) a given image of a given ID; determine, using the machine learning model and the given image, if the given ID was issued as a cryptographically signed ID or not; and upon determining that the given ID was issued as a cryptographically signed ID, employ one or more verification modules on the given image to determine validity of the given ID.

In some cases, the processing circuitry is further configured to determine if the system expected to obtain a cryptographically signed file associated with a given ID before instead obtaining the given image of the given ID.

In some cases, wherein the image is a screen capture of a digital wallet presenting the image of the ID on a user device or of a digitally signed document.

In some cases, the one or more verification modules include a data extraction module capable of extracting one or more Personally Identifiable Information (PII) representations from the given image and determining a matching score for the given image based on the one or more PII representations by utilizing a matching service capable of receiving the one or more PII representation and determine if they match information of known persons.

In some cases, the extraction of at least one PII representation of the one or more PII representations is performed by utilizing an unsupervised machine learning module.

In some cases, the matching service is external to the system.

In some cases, the one or more verification modules include a photo replacement forgery test module capable of determining a photo replacement forgery score for the given image by determining if a facial photograph included within the given image, if any, has been digitally replaced before inputting the given image to the system.

In some cases, the photo replacement forgery test module is a machine learning model trained utilizing a labeled training-data set comprising of a plurality of training records, each training record comprising: (i) a forgery training image, and (ii) a target label identifying if the facial photograph included within the given image has been digitally replaced or not.

In some cases, the one or more verification modules include a face comparison module capable of obtaining a selfie image of a person associated with the given ID, extracting a facial image of the person from the selfie and determining a face comparison score by comparing the facial image with an image facial image contained within the given image.

In some cases, the one or more verification modules include a live video verification module capable of determining a live video score by initiating a live video session with a person associated with the given ID.

In some cases, one or more questionnaires used during the live video session are automatically generated based on one or more PII representations extracted from the given image.

In some cases, one or more questionnaires used during the live video session are automatically generated based on information associated with an image facial image contained within the given image.

In some cases, the live video score is also based on the persons facial reactions.

In accordance with a second aspect of the presently disclosed subject matter, there is provided a method for determining if an image of an ID was issued as a cryptographically signed ID and validating the ID, the method comprising: obtaining, by a processing circuitry: (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and (B) a given image of a given ID; determining, by the processing circuitry, using the machine learning model and the given image, if the given ID was issued as a cryptographically signed ID or not; and upon determining that the given ID was issued as a cryptographically signed ID, employing, by the processing circuitry, one or more verification modules on the given image to determine validity of the given ID.

In some cases, the method further comprising: determining, by the processing circuitry, if the system expected to obtain a cryptographically signed file associated with a given ID before instead obtaining the given image of the given ID.

In some cases, the image is a screen capture of a digital wallet presenting the image of the ID on a user device or of a digitally signed document.

In some cases, the one or more verification modules include a data extraction module capable of extracting one or more Personally Identifiable Information (PII) representations from the given image and determining a matching score for the given image based on the one or more PII representations by utilizing a matching service capable of receiving the one or more PII representation and determine if they match information of known persons.

In some cases, the extraction of at least one PII representation of the one or more PII representations is performed by utilizing an unsupervised machine learning module.

In some cases, the matching service is external to the system.

In some cases, the one or more verification modules include a photo replacement forgery test module capable of determining a photo replacement forgery score for the given image by determining if a facial photograph included within the given image, if any, has been digitally replaced before inputting the given image to the system.

In some cases, the photo replacement forgery test module is a machine learning model trained utilizing a labeled training-data set comprising of a plurality of training records, each training record comprising: (i) a forgery training image, and (ii) a target label identifying if the facial photograph included within the given image has been digitally replaced or not.

In some cases, the one or more verification modules include a face comparison module capable of obtaining a selfie image of a person associated with the given ID, extracting a facial image of the person from the selfie and determining a face comparison score by comparing the facial image with an image facial image contained within the given image.

In some cases, the one or more verification modules include a live video verification module capable of determining a live video score by initiating a live video session with a person associated with the given ID.

In some cases, one or more questionnaires used during the live video session are automatically generated based on one or more PII representations extracted from the given image.

In some cases, one or more questionnaires used during the live video session are automatically generated based on information associated with an image facial image contained within the given image.

In some cases, the live video score is also based on the persons facial reactions.

In accordance with a third aspect of the presently disclosed subject matter, there is provided a non-transitory computer readable storage medium having computer readable program code embodied therewith, the computer readable program code, executable by at least one processing circuitry of a computer to perform a method for determining if an image of an ID was issued as a cryptographically signed ID and validating the ID, the method comprising: obtaining, by a processing circuitry: (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and (B) a given image of a given ID; determining, by the processing circuitry, using the machine learning model and the given image, if the given ID was issued as a cryptographically signed ID or not; and upon determining that the given ID was issued as a cryptographically signed ID, employing, by the processing circuitry, one or more verification modules on the given image to determine validity of the given ID.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
FIG. 1A is a schematic illustration of an example of an image of a document that was issued as a cryptographically signed document, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "employing", "obtaining", "identifying", "calculating", "generating", "alerting", "determining" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
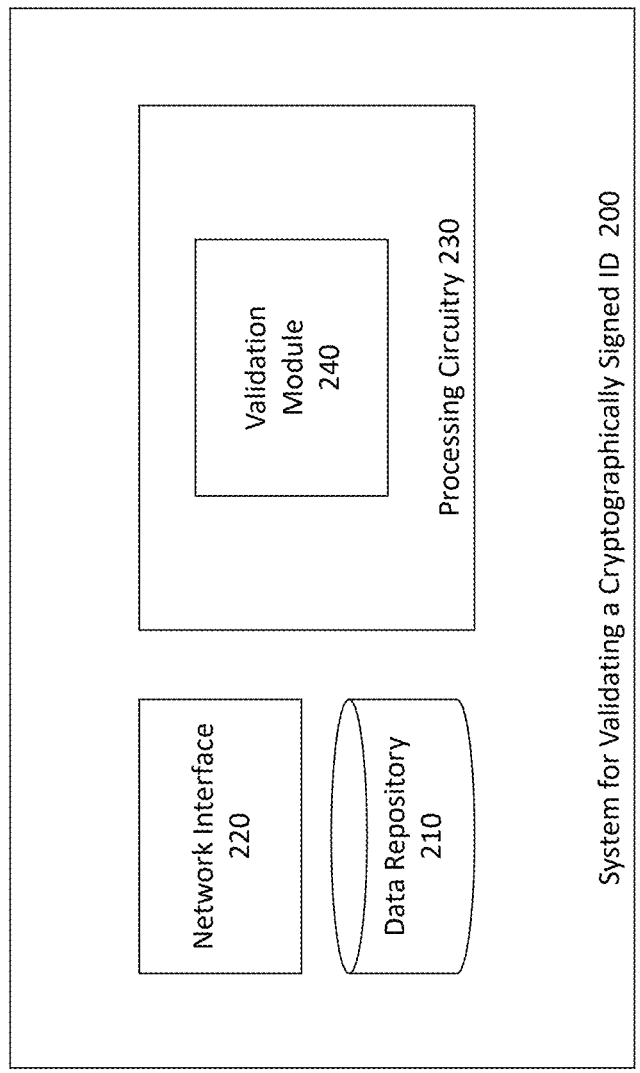
FIG. 2 is a block diagram schematically illustrating one example of a system for validating an image of a document that was issued as a cryptographically signed document, in accordance with the presently disclosed subject matter.
Figure 3:
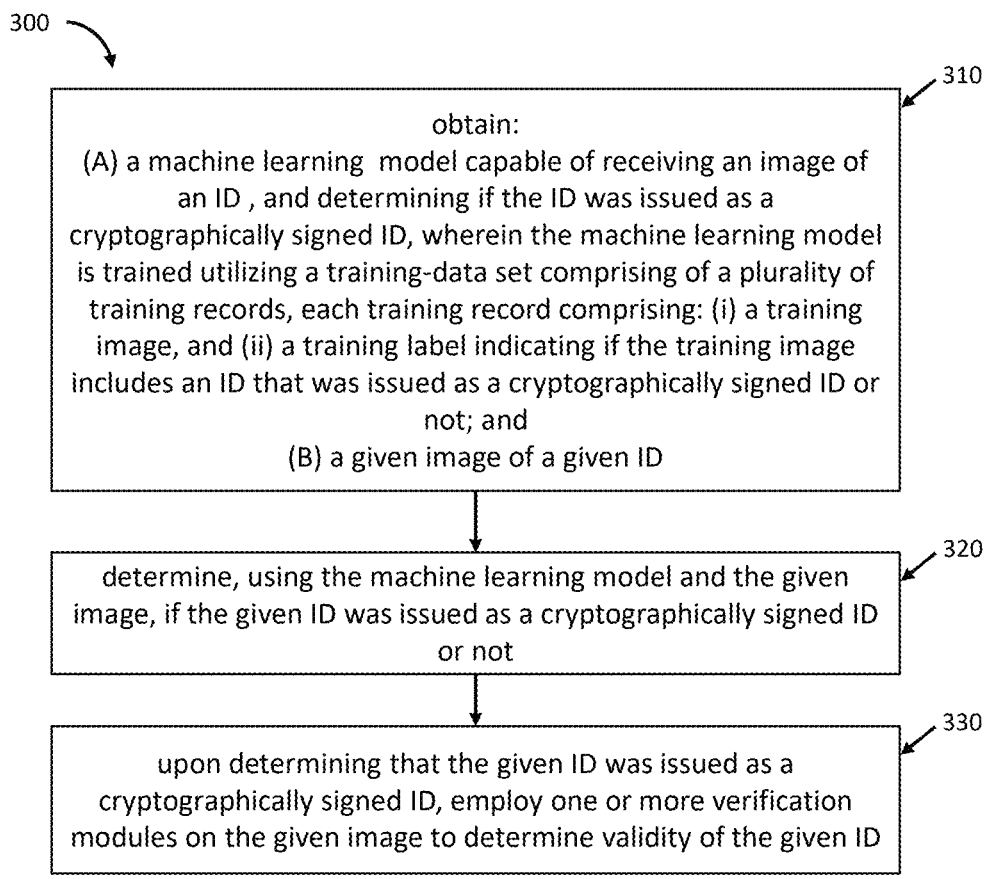
FIG. 3 is a flowchart illustrating an example of a sequence of operations carried out for validating an image of a document that was issued as a cryptographically signed document, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIG. 2 illustrates a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The described subject matter is a multi-layered system for the verification, validation and/or authentication of images of documents and/or digital IDs. As explained above, current verification, validation and/or authentication systems for documents and/or digital IDs face a significant yet often underestimated challenge. Many people attempt to validate their cryptographically signed documents and/or IDs by submitting an image-such as a photograph, screenshot, or any representation without the certificate-instead of the original signed document (such as: a signed Portable Document Format (PDF) file) or its accompanying JSON data. While the image retains the overall visual appearance, it excludes the vital cryptographic details, including the embedded signature and other security features. Consequently, most current validation and/or verification platforms cannot authenticate the submission and automatically reject it. This disconnect not only frustrates users who are trying to prove their identity, but also cause providers to drop these transactions which can lead to lost revenue.

The system can expect to receive a cryptographically signed file associated with a given document and/or ID that were issued as a cryptographically signed document and/or ID, but instead it receives an image of the given document and/or ID or a certificate-less document. Such an image lacks the vital cryptographic details, such as: the embedded signature and other integrity and/or security features.

The system utilizes a multi-layered approach to identify that the received image is an image of a document and/or an ID that were issued as a cryptographically signed document and/or ID and to verify and/or validate the received image. The system first makes a judgment—it determines if the image is of a document and/or an ID that were issued as a cryptographically signed document and/or ID or not. The accuracy of the identification of the image can be, for a non-limiting example, a 99% accuracy of identifying if the received image is of a document and/or an ID that were issued as a cryptographically signed document and/or ID or not. This can be performed by utilizing various mathematical and statistical algorithms. In some cases, these algorithms can be machine learning based, which utilize a machine learning model.

A machine learning model is a computational system designed to learn patterns or relationships from data and then apply that knowledge to make predictions, classifications, or decisions without requiring explicit programming for every possible scenario. In other words, the model automates the process of discovering rules or insights by analyzing example data. These models rely on a variety of mathematical and statistical methods and leverage the power of modern computing to handle large-scale data. Once trained, a machine learning model can be deployed in numerous applications-ranging from image recognition and natural language processing to fraud detection-often achieving both speed and accuracy beyond what is feasible with traditional, rule-based techniques.

Machine learning models generally fall into two main categories: supervised learning and unsupervised learning. In supervised learning, the model is trained on a dataset where each example has an associated label or correct answer. During training, the model adjusts its internal parameters to minimize the difference between its predictions and the actual labels. After this process, the model can predict labels for new data it has never seen before. A few examples of supervised learning algorithms include: Linear Regression, which predicts continuous values based on input features; Logistic Regression, often used for binary classification tasks like determining spam emails; Decision Trees and Random Forests, which split data into branches for classification or regression; eXtreme Gradient Boosting (XGBoost) which provides a regularizing gradient boosting framework; Support Vector Machines (SVM), which excel at separating data into classes via an optimal boundary or hyperplane; and Deep learning and/or Artificial Neural Networks, which mimic the structure of the human brain and are particularly effective for tasks like image recognition and speech processing.

Another category of machine learning models are unsupervised machine learning models. Unsupervised learning deals with unlabeled data, meaning the model must detect inherent patterns or structures without predefined labels. This approach is often used to discover hidden groupings, relationships, or features in the dataset. Common unsupervised learning algorithms include, for example: K-Means Clustering, which groups data points into clusters based on their similarity to a central point or "centroid"; Density-Based Spatial Clustering of Applications with Noise (DB-SCAN), which forms clusters in dense regions of data and can identify outliers; and Principal Component Analysis (PCA), a dimensionality reduction technique that compresses the data into fewer dimensions while preserving as much variance as possible.

Beyond these two main categories, other paradigms also exist, such as semi-supervised learning (where only a portion of the data is labeled) and reinforcement learning (where an agent learns by interacting with an environment and receiving feedback in the form of rewards or penalties). Nonetheless, supervised and unsupervised models remain the most prevalent approaches. By selecting the appropriate method and algorithm for a given problem, machine learning practitioners can create highly effective systems capable of uncovering patterns in data, addressing complex challenges, and continuously improving as they are exposed to more information.

The machine learning model utilized by the system has been trained to be capable of receiving the image of the document and/or the ID and determining if the image is of a document and/or an ID that were issued as a cryptographically signed document and/or ID or not. The training of the machine learning model can be performed by utilizing a training-data set comprising of a plurality of training records. In some cases, the training-data set is a labeled training-data set. In these cases, at least some of the training record comprising: (i) a training image, and (ii) a training label indicating if the training image includes a document and/or an ID that were issued as a cryptographically signed document and/or ID or not. In some cases, the machine learning model has been trained on multiple labels, to determine if the received image is one of: image of a physical document and/or ID card, a scan of a document and/or ID card, a printout of a document and/or ID card or an image of a document and/or ID that were issued as a cryptographically signed document and/or ID.

The described system utilizes the machine learning model as a judgment machine learning model to determine if the image is of a document and/or ID were issued as a cryptographically signed document and/or ID or not. Upon determining that the image is of a document and/or ID were issued as a cryptographically signed document and/or ID, the system can employ one or more validation and/or verification modules on the given image to determine validity of the given document and/or ID. These validation and/or verification modules can include: a data extraction and matching module, a photo replacement forgery test module, a face comparison module, a live video verification module, or any other validation and/or verification module, as further detailed herein, inter alia with reference to FIG. 3.

Bearing this in mind, attention is now drawn to FIG. 1A, showing a schematic illustration of an example of an image of a document that was issued as a cryptographically signed document, in accordance with the presently disclosed subject matter.

A cryptographically signed document and/or ID is a digital file that has been protected using encryption algorithms. This process ensures that the document and/or ID cannot be altered without detection and that its authenticity can be verified through the signer's public key. Examples range from digitally signed contracts that bind two parties to an agreement, to government-issued digital identification cards, driver's licenses, and passports that contain embedded cryptographic signatures. By incorporating cryptographic hash functions and private-key signatures, these documents and/or IDs become tamper-evident and legally recognized in many jurisdictions.

An image of a document and/or ID that was issued as a cryptographically signed document and/or ID 100 refers to a visual capture-such as: a photograph, scanned image, a screenshot, or any other visual capture—of this digital file. Unlike the original cryptographically signed version, the image of a document and/or ID that were issued as a cryptographically signed document and/or ID 100 typically lacks the embedded cryptographic data necessary for validation. The appearance of seals, signatures, and identifying information may still be visible, but without the underlying cryptographic structure, verifying the document's and/or ID's authenticity becomes impossible through current automated verification and/or validation systems. They require the presence of the signature bits and associated metadata, which are not preserved in a simple image format.

A cryptographically signed driver's license, for instance, may include the holder's personal information-name, date of birth, and physical characteristics-along with a unique cryptographic signature generated by a government authority's private key used in centralized scenarios. In a decentralized scenarios (such as: the Electronic IDentification, Authentication, and trust Services (EIDAS) regulation in the European Union), the user also holds the private key utilized to generate the cryptographically signed document. A similar approach may be used for other government-issued IDs or certificates, including digital passports, birth certificates, university degrees, and membership cards. In all these cases, the primary benefit lies in the verifiability of the cryptographic seal, which confirms both the authenticity of the issuing authority and the unaltered state of the document or ID. However, once these documents are converted into an image of a document and/or ID that was issued as a cryptographically signed document and/or ID 100—for instance, when someone takes a screenshot of their digital driver's license—the cryptographic elements that allow machines or verification systems to check legitimacy are stripped away.

In practice, an image of a document and/or ID that was issued as a cryptographically signed document and/or ID 100 may show all the visible features, such as an official logo, the holder's photograph, and textual fields detailing relevant information. Yet the core cryptographic signature, invisible to the naked eye, is lost in this transformation. Consequently, when individuals attempt to use such an image for verification, current known in the art systems often reject it because the crucial signature data cannot be accessed. Or worse, current known in the art systems may verify the image as if it was an old school ID, opening the door to easy fraud attacks since the digital IDs are lacking all the security features that old-school IDs consist of, as digital IDs have the cryptographic signature as the main protector. This highlights the distinction between visually recognizable features and the concealed layers of cryptographic material that provide robust assurances of identity and document integrity.

A non-limiting exemplary image of a document and/or ID that was issued as a cryptographically signed document and/or ID 100 is depicted in FIG. 1A. This non-limiting exemplary image is a digital High Risk Work License displayed on a screen of a user device. The license is labeled "High Risk Work License" at the top right, and just below it can appear essential information which include Personally Identifiable Information (PII) representations 120, such as: a license number, a holder's name, a validity period, a Quick Response (QR) Code, etc.

On the lower-left portion of the non-limiting exemplary image of a document and/or ID that was issued as a cryptographically signed document and/or ID 100, there is a prominently visible QR code for quick scanning and verification of the credentials.

At the top-right of the non-limiting exemplary image of a document and/or ID that was issued as a cryptographically signed document and/or ID 100, there is a facial photograph 110 headshot of the individual holder of the "High Risk Work License" is visible, providing a clear photograph for visual identification. The image of a document and/or ID that was issued as a cryptographically signed document and/or ID 100 is displayed within a typical digital wallet or official government licensing application environment.

While the application interface and displayed details suggest that this exemplary High-Risk Work License is cryptographically signed and can be verified electronically, this image of a document and/or ID that was issued as a cryptographically signed document and/or ID 100 only captures the visual presentation. As such, it lacks the underlying cryptographic data (e.g., the digital signature bits and metadata) required by automated systems to verify authenticity.

Figure 1B:
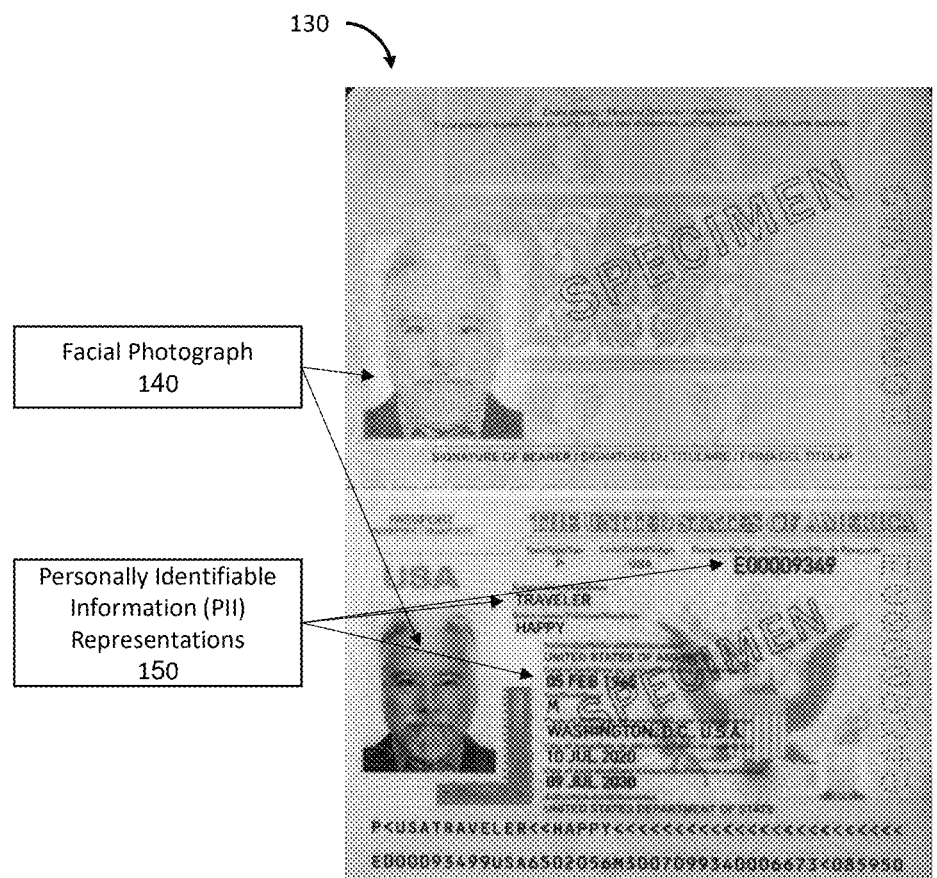
FIG. 1B is a schematic illustration of an example of an image of a document that was not issued as a cryptographically signed document, in accordance with the presently disclosed subject matter, in accordance with the presently disclosed subject matter.

After describing a non-limiting example of an image of a document and/or ID that were issued as a cryptographically signed document and/or ID, attention is now drawn to FIG. 1B.

FIG. 1B, depicts a schematic illustration of an example of an image of a document that was not issued as a cryptographically signed document, in accordance with the presently disclosed subject matter, in accordance with the presently disclosed subject matter.

As detailed herein, a document and/or an ID that was not issued as a cryptographically signed file typically relies on traditional, tangible security measures rather than sophisticated digital signature algorithms. A non-limiting example is a standard U.S. passport. Although passports contain elements such as a unique identifier (passport number), a physical photograph, and possibly a Machine-Readable Zone (MRZ) or Radio-Frequency IDentification (RFID) chip, they do not inherently come with an embedded cryptographic signature that can be instantly verified through a digital public-private key system. Instead, their authenticity is often confirmed by government security features like holograms, microprinting, watermarks, and specialized inks. The RFID chip, where present, does store electronically readable data, but it is not automatically considered a cryptographically signed "document" in the sense of digital signatures used for online verification processes.

An image of a document and/or an ID that were not issued as a cryptographically signed document and/or ID 130, such as a photograph or scanned copy of a U.S. passport, captures the physical appearance and visible security features but does not include any embedded digital signature data. The person's name, passport number, issuing authority, date of birth, and expiration date may all be visible. Additionally, you may see the bearer's headshot, personal details, and various official seals or stamps. These are tangible elements meant for human inspection, border control checks, or blacklight authentication, rather than automated cryptographic validation. As a result, when someone attempts to verify the passport using only an image of a document and/or ID that were not issued as a cryptographically signed document and/or ID 130, advanced digital verification systems cannot confirm its authenticity in the same manner they would for a cryptographically signed digital document.

Non-cryptographically signed documents or IDs often include a wide range of paper-based credentials, driver's licenses without a digital signature component, membership cards, and older-style birth certificates. They commonly feature visual signs of legitimacy, such as embossed seals, physical stamps, or color-shifting inks, alongside textual information about the holder. While these methods provide some level of trust in face-to-face inspections, they do not readily translate into seamless digital authentication. Consequently, an image of a document and/or ID that were not issued as a cryptographically signed document and/or ID 130 offers only the outer appearance of validity, with no mechanism to verify its integrity or origin using cryptographic keys.

A non-limiting exemplary image of a document and/or an ID that were not issued as a cryptographically signed document and/or ID 130 in FIG. 1B shows a U.S. passport specimen. The name on this sample document is listed as "Traveler Happy". There are two facial photograph 140 headshot of the individual in the image. Directly beneath the name, the passport details include some PII representations 150 such as: an identifying passport number "E00009349," date of issue "9 Jul. 2020," and issuing authority listed as "Washington D.C., USA.". Various textual fields indicate the citizenship ("USA"), the type of document ("Passport"), and the Department of State. Visible security elements typical of a U.S. passport—such as an eagle emblem—are also part of the design.

This non-limiting example of an image of a document and/or ID that were not issued as a cryptographically signed document and/or ID 130 contains the passport's physical attributes, watermarks, and visible personal information, but it does not incorporate the cryptographic elements that a digitally signed document would include for automated electronic validation and/or verification.

Attention is drawn to FIG. 2, a block diagram schematically illustrating one example of a system for validating an image of a document that was issued as a cryptographically signed document, in accordance with the presently disclosed subject matter.

In accordance with the presently disclosed subject matter, the system for validating an image of a document that was issued as a cryptographically signed document (also referred herein as: "system 200") can comprise a network interface 220. The network interface 220 (e.g., a network card, a Wi-Fi client, a Li-Fi client, 3G/4G/5G client, satellite communications or any other component), enables system 200 to communicate over a network with external systems and handles inbound and outbound communications from such systems. For example, system 200 can receive and/or send, through network interface 220, one or more given images of a given document and/or ID, a training-data set, Personally Identifiable Information (PII) representations 120, selfie images of persons associated with a given document and/or ID, live video, questionnaires, etc.

System 200 can further comprise or be otherwise associated with a data repository 210 (e.g., a database, a storage system, a blockchain based storage, a memory including Read Only Memory—ROM, Random Access Memory—RAM, or any other type of memory and/or storage, etc.) configured to store data. Some examples of data that can be stored in the data repository 210 include: one or more given images of a given document and/or ID, a training-data set, Personally Identifiable Information (PII) representations 120, selfie images of persons associated with a given document and/or ID, live video, questionnaires, etc. Data repository 210 can be further configured to enable retrieval and/or update and/or deletion of the stored data. It is to be noted that in some cases, data repository 210 can be distributed, while system 200 has access to the information stored thereon, e.g., via a wired or wireless network to which system 200 is able to connect (utilizing its network interface 220).

System 200 further comprises processing circuitry 230. Processing circuitry 230 can be one or more processing units (e.g., central processing units), microprocessors, microcontrollers (e.g., microcontroller units (MCUs) cloud servers, graphical processing units (GPUs), or any other computing devices or modules, including multiple and/or parallel and/or distributed processing units, which are adapted to independently or cooperatively process data for controlling relevant system 200 resources and for enabling operations related to system's 200 resources.

The processing circuitry 230 comprises a validation module 240, configured to perform a process for validating an image of a document that was issued as a cryptographically signed document 100. In some cases, the document can be a digital ID. In such cases, validation module 240 is configured to perform a process for validating an image of an ID that was issued as a cryptographically signed ID, as further detailed herein, inter alia with reference to FIG. 3.

Having described the block diagram of system 200, attention is now drawn to FIG. 3 showing a flowchart illustrating an example of a sequence of operations carried out for validating an image of a document and/or an ID that were issued as a cryptographically signed document and/or ID 100, in accordance with the presently disclosed subject matter. Accordingly, system 200 can be configured to perform a process for validating an image of a document that was issued as a cryptographically signed document 300, e.g., using the validation module 240.

System 200 could expect to receive a cryptographically signed file associated with a given document and/or ID or receive cryptographic details associated with a given document and/or ID (for example: in a JSON format), but instead system 200 receives an image of the given document and/or ID 100 or a certificate-less document. Such an image retains the overall visual appearance, it lacks the vital cryptographic details, including the embedded signature and other security features.

To validate and/or verify such an image, system 200 first makes a judgment-system 200 determines if the image is an image of a document and/or an ID that were issued as a cryptographically signed document and/or ID 100 or not. For this purpose, system 200 obtains: (A) a machine learning model capable of receiving an image of a document and/or an ID 100, and determining if the document and/or the ID were issued as a cryptographically signed document and/or ID, wherein the machine learning model is trained utilizing a training-data set comprising of a plurality of training records, each training record comprising: (i) a training image, and (ii) a training label indicating if the training image includes an ID that was issued as a cryptographically signed ID or not; and (B) a given image of a given document or of a given ID (block 310). In some cases, the image is a visualization or a screen capture of a digital wallet presenting the image of the document and/or the ID on a user device (such as: a smartphone, a PC, a laptop, a smartwatch, etc.) or of a cryptographically and/or digitally signed document (such as: a singed PDF document). A non-limiting example of such an image of a document and/or an ID that were issued as a cryptographically signed document and/or ID 100 is depicted in FIG. 1A.

The machine learning model utilized by system 200 can be a supervised machine learning model, an unsupervised machine learning model or a semi-supervised machine learning model. The machine learning model can be based on one or more Deep Learning and/or Artificial Neural Network (ANN) techniques, for example: Convolutional Neural Networks (CNN), Deep Stacking Networks (DSN), Graph Neural Network (GNN), machine learning techniques such as SVM, XGBoost, Light Gradient Boosting Machine (LGBM), etc.

The machine learning model utilized by system 200 can be trained utilizing a training data set. In some cases, the training-data set is a labeled training data set comprising of a plurality of training records. At least one of the training records comprises of: a training image, and a training label. The training label is indicative if the training image includes a document and/or an ID that were issued as a cryptographically signed document and/or ID or not. In these cases, the training label can be a binary value.

A non-limiting example of such training records can be: (a) a first exemplary training record comprising of: the image depicted in FIG. 1A which is an image of an ID that was issued as a cryptographically signed ID 100 and of a training label with the value "True", and (b) a second exemplary training record comprising of: the image depicted in FIG. 1B which is an image of an ID that was not issued as a cryptographically signed ID and of a training label with the value "False".

In some cases, the machine learning model has been trained on multiple labels, to determine if the received image is one of: image of a physical document and/or ID card, a scan of a document and/or ID card, a printout of a document and/or ID card, an image of a document and/or ID that were issued as a cryptographically signed document and/or ID 100, or any other type of image.

After obtaining the machine learning model and the given image, system 200 can determine, using the machine learning model and the given image, if the given document was issued as a cryptographically signed document or not or if the given ID was issued as a cryptographically signed ID or not (block 320). By doing this, system 200 determines if the given image is an image of a document and/or ID that were issued as a cryptographically signed document and/or ID 100 or not.

In a non-limiting example, system 200 receives as the given image, the image depicted in FIG. 1A, which is an image of an ID that was issued as a cryptographically signed ID 100. System 200 will determine, using the machine learning module, that the given image is actually an image of an ID that was issued as a cryptographically signed ID 100 and the process for validating an image of a document that was issued as a cryptographically signed document 300 will continue as detailed in block 330 below.

In some cases, when the machine learning model has been trained on multiple labels, system 200 can determine if the given image is one of: an image of a physical document and/or ID card, a scan of a document and/or ID card, a printout of a document and/or ID card, an image of a document and/or ID that were issued as a cryptographically signed document and/or ID 100, or any other type of an image.

If system 200 determines that the given image is not an image of a document and/or ID that were issued as a cryptographically signed document and/or ID 100 the validation and/or verification of the given image can be performed utilizing known methods for validating and/or verifying images of documents and/or IDs that are not an image of an ID that was not issued as a cryptographically signed ID 100. In a non-limiting example, when system 200 receives as the given image, the image depicted in FIG. 1B, which is an image of an ID that was not issued as a cryptographically signed ID 130, system 200 determines, using the machine learning module, that the given image is actually not an image of an ID that was issued as a cryptographically signed ID 100 and the process for validating an image of a document that was issued as a cryptographically signed document 300 will continue utilizing the known methods for validating and/or verifying images of documents and/or IDs that are not an image of an ID that was not issued as a cryptographically signed ID 100.

Upon system 200 determining that the given image contains a given ID and/or a given document that was issued as a cryptographically signed ID and/or cryptographically signed document, system 200 can employ one or more verification modules on the given image to determine validity of the given document and/or of the given ID (block 330). It is to be noted that the validation and/or verification modules can be employed in any sequence of employment determined by system 200. In some cases, one or more of the validations and/or verifications modules can be employed by system 200 more than once for a single image or document.

These validation and/or verification modules can include, but are not-limited to: a data extraction and matching module, a photo replacement forgery test module, a face comparison module, a live video verification module, or any other validation and/or verification module, as further detailed herein. These validation and/or verification modules can each calculate a validation and/or verification score for the given image. System 200 can calculate an overall validation and/or verification score for the given image based on the scores given to the given image by the validation and/or verification modules. The overall validation and/or verification score can be based on an average of the individual validation and/or verification scores given by the validation and/or verification modules, or on the highest individual score, or on the lowest individual, or on any other calculation or rule associated with the individual scores. In some cases, system 200 can determine which validation and/or verification modules to employ for each given image received by system 200 by performing an initial analysis of the received image. For example: an image without a photo will not overgo the photo replacement forgery test module.

Continuing the non-limiting example above, system 200 obtained the image depicted in FIG. 1A as the given image. System 200 determined, utilizing the machine learning model, that this image is of an ID that was issued as a cryptographically signed ID and/or document 100. Upon this determination, system 200 utilizes a multi-layered validation and/or verification scheme by employing one or more validation and/or verification modules on the image depicted in FIG. 1A to determine validity of the ID shown in the image of FIG. 1A.

For example, system 200 can employ on the given image and/or given document a data extraction and matching module that returns a matching score for the given image and/or the given document. System 200 can then employ a photo replacement forgery test module on the given image and/or the given document to determine a photo replacement forgery score for the given image and/or the given document. System 200 can then employ a face comparison module to determine a face comparison score for the given image and/or the given document. System 200 can then employ a live video verification module to determine a live video score for the given image and/or the given document. System 200 can then determine an overall validation score for the obtained given image and/or the obtained given document based on the matching score, the photo replacement forgery score, the face comparison score, and the live video score. The overall validation score can be, for example, an average of the matching score, the photo replacement forgery score, the face comparison score, and the live video score. Upon the overall validation score for the given image and/or for the given document is above a validation threshold, system 200 validates the given image and/or the given document and thus validates the ID appearing in the given image and/or associated with the given document. In this example, when the overall validation score is below the validation threshold, system 200 determines that the obtained given image and/or the obtained given document are not valid, thus the ID appearing in the given image and/or associated with the given document has not been validated by system 200.

A data extraction module is a validation and/or verification module that is capable of extracting one or more Personally Identifiable Information (PII) representations 110 from the given image and/or the given document. Continuing our non-limiting example above, the PII representation 110 extracted from the image of the ID that was issued as a cryptographically signed ID 100 depicted in FIG. 1A include: a license number, a holder's name, and a validity period, etc.

The extraction of at least one PII representation of the one or more PII representations 110 can be performed by system 200 by utilizing a machine learning module. For example, by utilizing an unsupervised machine learning module for extracting the PIIs from the given image and/or given document. This can involve a multi-step process that combines automated text recognition and pattern discovery. First, the image can undergo Optical Character Recognition (OCR) to convert the textual components into machine-readable text, handling diverse ID formats by extracting text regardless of varying fonts, layouts, or background colors. Once the text is extracted, the unsupervised machine learning module can start analyzing the data, seeking underlying similarities or relationships without relying on predefined labels or annotations. In an unsupervised approach, clustering or dimensionality-reduction algorithms such as k-means or hierarchical clustering can be applied to the OCR output. These algorithms look for patterns in the text that may indicate common fields like "Name," "Date of Birth," "ID Number," or "Address." By grouping similar text elements together, the model can discover categories or segments of information that naturally emerge from the data.

The unsupervised machine learning model's results are then interpreted or refined to map them to actual PII representations 120. At this stage, additional domain rules can be applied to confirm or validate the clusters. For example, a text cluster thought to represent "Date of Birth" may be checked against known date formats (e.g., MM/DD/YYYY). Likewise, if a cluster seems to represent "Name," further checks or dictionaries may be used to verify consistency and reduce false positives. This iterative process ensures that the unsupervised model's discovered patterns align with real-world ID attributes.

The data extraction module can determine a matching score for the given image based on the one or more extracted PII representations 120 by utilizing a matching service. A matching service is a specialized system or process designed to compare, reconcile, and validate pieces of PIIs across different databases or data sources. These PIIs can include: names, addresses, email addresses, phone numbers, social security numbers, dates of birth, and other sensitive data that can uniquely identify an individual. By matching these details, organizations seek to ensure data accuracy, detect duplicates, maintain up-to-date records, and safeguard against fraud or misuse of personal information. The matching series is capable of receiving the one or more PII representations 110 extracted from the given image and/or the given document and determine if they match information of known persons.

This matching service can work by taking a set of personal details-often pulled from various locations such as internal databases, online platforms, third-party data providers, or application forms—and using specialized algorithms to identify records that belong to the same individual. The matching algorithms can range from simple to extremely complex. Basic matching may rely on exact comparisons of names or email addresses; more advanced approaches employ fuzzy logic, phonetic comparison, or data science techniques to account for variations and errors such as misspellings, name changes, or differences in formatting. In some cases, the matching service can be external to system 200. In other cases, the matching service is part of system 200.

Continuing our non-limiting example above, the PII representations 120 extracted from the image of the ID that was issued as a cryptographically signed ID 100 depicted in FIG. 1A including: a license number, a holder's name, and a validity period have been provided to a matching service. The matching service has found identify records that belong to the same individual and thus matched the PII representations 120 and gave them a matching score of 10 out of 10.

Another verification and/or validation module that can be employed by system 200 includes a photo replacement forgery test module. The photo replacement forgery test module is capable of determining a photo replacement forgery score for the given image. This can be done by determining if a facial photograph included within the given image, has been digitally replaced before inputting the given image to the system The photo replacement forgery test module detects whether a facial photograph within an image has been swapped or altered prior to being obtained by system 200. The photo replacement forgery test module identifies subtle signs of tampering-whether it involves a simple crop-and-paste operation, or more advanced techniques such as deepfakes. In operation, the module can begin by isolating and extracting the facial region from the image. This can involve utilizing one or more facial detection algorithms that can locate the boundaries of a face and measure aspects of the face's geometry. Once extracted, the module evaluates a range of forensic features to gauge the authenticity of the face within the photo. These features can include artifacts left behind by editing tools (e.g., remnants of inconsistent pixels or sudden luminance shifts), discrepancies in color balance, abrupt changes in texture, or slight distortions in the background. A possible approach also incorporates machine learning models trained on large datasets of genuine and manipulated images to identify statistical anomalies that are indicative of a swapped or artificially generated face. For example, such a forgery test machine learning model can be trained utilizing a labeled training-data set comprising of a plurality of forgery test training records. These training record comprise: (i) a forgery training image, and (ii) a target label identifying if the facial photograph included within the given image has been digitally replaced or not.

After collecting these indicators, the module computes the photo replacement forgery score, which reflects the likelihood that the facial image has been replaced or tampered with. This score is derived from a combination of the forensic features as well as any machine learning inferences. Typically, a high forgery score would prompt further review or an automated rejection of the image, while a low score would indicate that the face within the image is most likely genuine and has not been digitally altered. The threshold for what constitutes a suspicious or acceptable score can be configured to align with the security needs of the specific application or industry.

Continuing our non-limiting example above, the image of the ID that was issued as a cryptographically signed ID 100 depicted in FIG. 1A includes a facial photograph 110 headshot of the individual identified as the holder of the "High Risk Work License" which is visible and provides a clear photograph for visual identification. The photo replacement forgery module identifies the facial photograph 110 and utilizes the forgery test machine learning model to determine that facial photograph 110 was not forged in this example and determines a photo replacement forgery score of 10 out of 10 for the given image.

Another verification and/or validation module that can be employed by system 200 includes a face comparison module. The face comparison module is designed to verify the identity of an individual associated with the obtained given ID and/or given document. This can be achieved by comparing two images of his or hers face-a selfie photograph and a facial photograph 110 found within the given image and/or the given document obtained by system 200. The module receives or captures a selfie image of the individual. This step can be facilitated by a camera on a mobile device, kiosk, or any other imaging hardware that can be utilized by the individual associated with the obtained given ID and/or given document.

Once obtained, system 200 can employ a face detection algorithm to isolate the individual's face within the selfie image, often normalizing the extracted face by adjusting factors such as size, orientation, and lighting conditions. System 200 can now similarly normalize the facial photograph 110 obtained from the given image and/or the given document to ensure it can be effectively compared with the selfie. The face comparison module then uses a face recognition algorithm to extract a set of facial features or embeddings from both images. These features often come in the form of high-dimensional vectors, which can be derived using deep learning models trained on large, diverse datasets of human faces.

Once both faces have been transformed into comparable feature sets, the face comparison module can then determine a face comparison score by comparing the facial image with an image facial image contained within the given image and/or document. This face comparison score reflects the degree of match between the selfie image's features and the facial photograph 110. If the comparison score surpasses a predefined threshold, system 200 can deem the faces to match; otherwise, the comparison is considered unsuccessful or requires further verification.

Continuing our non-limiting example above, the image of the ID that was issued as a cryptographically signed ID 100 depicted in FIG. 1A includes a facial photograph 110 headshot of the individual identified as the holder of the "High Risk Work License". The face comparison module identifies the facial photograph 110. It requests the individual associated with the image of the ID that was issued as a cryptographically signed ID 100 to take a selfie using his smartphone. The face comparison module analyses and compares the selfie and the facial photograph 110 to determine a face comparison score of 10 out of 10 for the given image.

Another verification and/or validation module that can be employed by system 200 includes a live video verification module. The live video verification module is capable of determining a live video score confirming the authenticity and presence of the individual associated with the image of the ID that was issued as a cryptographically signed ID 100 through a real-time video session. The live video verification module can initiate a video call—this can be with a live human interviewer or an automated system (i.e., a "robot" or a video chatbot) presenting a series of questions. The main purpose is to evaluate whether the individual on camera is genuinely present, responding coherently, and matches the individual associated with the image of the ID that was issued as a cryptographically signed ID 100 that should be undergoing verification. By capturing and analyzing the person's responses-both verbal and non-verbal—the live video verification module can generate the live video score, which represents the confidence level that the individual is legitimate.

During a live interview, the live video verification module can utilize various video stream processing techniques to perform several checks. First, it can establish liveness by looking for natural facial movements, blinking, variations in expression, facial reactions, and other biometric signals that are difficult for still images or digital forgeries to replicate. Another implementation can also analyze speech, requesting the individual to recite specific phrases or answers to randomly generated questions or answers to questions generated based on the data derived from the given image and/or given document. For example: data derived from the one or more PII representations 120 and the facial photograph 110 extracted from the given image and/or the given document. This helps ensure that pre-recorded or deepfake content cannot easily bypass the session. Additionally, the live video verification module can confirm that the visual and audio streams remain in sync, flagging any discrepancies that might arise if a fraudulent user tries to substitute genuine content mid-session.

The live video verification module can employ biometric recognition technology (for example: fingerprint recognition, facial recognition, voice recognition, etc.) to match the individual in the video with a known reference image-potentially utilizing the face comparison module. Likewise, speech recognition can be used to validate the consistency of the individual's vocal characteristics, comparing them to an existing voice profile if such a mechanism is part of the verification process.

The session can be structured around a questionnaire, with the interviewer (human or virtual) asking pre-determined or dynamic questions to confirm personal details, knowledge-based answers, or other identifiers that only the real user should know. In some cases, one or more questionnaires used during the live video session are automatically generated by system 200 based, for example, on the one or more PII representations 120 and the facial photograph 110 extracted from the given image. Continuing our non-limiting example above, the obtained given image is the image of the ID that was issued as a cryptographically signed ID 100 depicted in FIG. 1A. This image includes a facial photograph 110 headshot of the individual identified as the holder of the "High Risk Work License". The live video verification module initiates a live-video session with the individual associated with the given image. The questionnaires can include questions associated with the PII representations 120, for example: "What is the validity period of your license?". The live video verification module will expect the correct answer of: "valid from "15 Jul. 2018" until "15 Jul. 2023". The questionnaires can also include questions associated with the facial photograph 110, for example a question deriving from the background of the facial photograph 110 (which depicts a famous location in a given city): "Where was the facial photograph 110 taken?". The live video verification module will expect the correct answer of the given city.

Upon completion of these checks, the live video verification module calculates the live video score, reflecting the overall confidence in the individual's identity and presence. This live video score can blend factors such as: evidence of liveness, facial expressions, correctness and coherence of the responses to the questioner, and facial match accuracy Higher scores can indicate a higher likelihood that the individual on the live video session is indeed the correct individual associated with the image and/or document. Lower scores can trigger additional scrutiny or an additional manual review.

Continuing our non-limiting example above, the image of the ID that was issued as a cryptographically signed ID 100 depicted in FIG. 1A includes a facial photograph 110 headshot of the individual identified as the holder of the "High Risk Work License" and one or more PII representations 120. The live video verification module initiates a live video session with the individual associated with the obtained image and/or the obtained document. The live video verification module asks the individual questions based on the facial photograph 110 and on the PII representations 120. The live video verification module determines based on the individual's overall appearance, responsiveness and response correctness a live video verification score of 10 out of 10 for the given image.

System 200 can now determine an overall validation score for the obtained given image and/or the obtained given document based on the matching score, the photo replacement forgery score, the face comparison score, and the live video score described in the non-limiting examples above. The overall validation score can be, in this example, the average of the matching score, the photo replacement forgery score, the face comparison score, and the live video score-which is a 10 out of 10. Upon the overall validation score for the given image and/or for the given document is above a validation threshold, of for example 9 out of 10, system 200 validates the given image, thus validating the ID appearing in the given image.

It is to be noted, with reference to FIG. 3, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for determining if an image of an Identification Document (ID) was issued as a cryptographically signed ID and validating the ID, the system comprising a processing circuitry configured to:
   obtain:
   (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and
   (B) a given image of a given ID;
   determine, using the machine learning model and the given image, if the given ID was issued as a cryptographically signed ID or not; and
   upon determining that the given ID was issued as a cryptographically signed ID, employ one or more verification modules on the given image to determine validity of the given ID.

2. The system of claim 1, wherein the processing circuitry is further configured to determine if the system expected to obtain a cryptographically signed file associated with a given ID before instead obtaining the given image of the given ID.

3. The system of claim 1, wherein the image is a screen capture is of a digital wallet presenting the image of the ID on a user device or of a digitally signed document.

4. The system of claim 1, wherein the one or more verification modules include a data extraction module capable of extracting one or more Personally Identifiable Information (PII) representations from the given image and determining a matching score for the given image based on the one or more PII representations by utilizing a matching service capable of receiving the one or more PII representation and determine if they match information of known persons.

5. The system of claim 1, wherein the one or more verification modules include a photo replacement forgery test module capable of determining a photo replacement forgery score for the given image by determining if a facial photograph included within the given image, if any, has been digitally replaced before inputting the given image to the system.

6. The system of claim 5, wherein the photo replacement forgery test module is a machine learning model trained utilizing a labeled training-data set comprising of a plurality of training records, each training record comprising: (i) a forgery training image, and (ii) a target label identifying if the facial photograph included within the given image has been digitally replaced or not.

7. The system of claim 1, wherein the one or more verification modules include a face comparison module capable of obtaining a selfie image of a person associated with the given ID, extracting a facial image of the person from the selfie and determining a face comparison score by comparing the facial image with an image facial image contained within the given image.

8. The system of claim 1, wherein the one or more verification modules include a live video verification module capable of determining a live video score by initiating a live video session with a person associated with the given ID.

9. The system of claim 8, wherein one or more questionnaires used during the live video session are automatically generated based on one or more Personally Identifiable Information (PII) representations extracted from the given image.

10. The system of claim 9, wherein one or more questionnaires used during the live video session are automatically generated based on information associated with an image facial image contained within the given image.

11. A method for determining if an image of an Identification Document (ID) was issued as a cryptographically signed ID and validating the ID, the method comprising:
  obtaining, by a processing circuitry:
  (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and
  (B) a given image of a given ID;
  determining, by the processing circuitry, using the machine learning model and the given image, if the given ID was issued as a cryptographically signed ID or not; and
  upon determining that the given ID was issued as a cryptographically signed ID, employing, by the processing circuitry, one or more verification modules on the given image to determine validity of the given ID.

12. The method of claim 11, further comprising: determining, by the processing circuitry, if the system expected to obtain a cryptographically signed file associated with a given ID before instead obtaining the given image of the given ID.

13. The method of claim 11, wherein the image is a screen capture is of a digital wallet presenting the image of the ID on a user device or of a digitally signed document.

14. The method of claim 11, wherein the one or more verification modules include a data extraction module capable of extracting one or more Personally Identifiable Information (PII) representations from the given image and determining a matching score for the given image based on the one or more PII representations by utilizing a matching service capable of receiving the one or more PII representation and determine if they match information of known persons.

15. The method of claim 11, wherein the one or more verification modules include a photo replacement forgery test module capable of determining a photo replacement forgery score for the given image by determining if a facial photograph included within the given image, if any, has been digitally replaced before inputting the given image to the system.

16. The method of claim 15, wherein the photo replacement forgery test module is a machine learning model trained utilizing a labeled training-data set comprising of a plurality of training records, each training record comprising: (i) a forgery training image, and (ii) a target label identifying if the facial photograph included within the given image has been digitally replaced or not.

17. The method of claim 11, wherein the one or more verification modules include a face comparison module capable of obtaining a selfie image of a person associated with the given ID, extracting a facial image of the person from the selfie and determining a face comparison score by comparing the facial image with an image facial image contained within the given image.

18. The method of claim 11, wherein the one or more verification modules include a live video verification module capable of determining a live video score by initiating a live video session with a person associated with the given ID.

19. The method of claim 18, wherein: (a) one or more questionnaires used during the live video session are automatically generated based on one or more Personally Identifiable Information (PII) representations extracted from the given image, and (b) one or more questionnaires used during the live video session are automatically generated based on information associated with an image facial image contained within the given image.

20. A non-transitory computer readable storage medium having computer readable program code embodied therewith, the computer readable program code, executable by at least one processing circuitry of a computer to perform a method for determining if an image of an Identification Document (ID) was issued as a cryptographically signed ID and validating the ID, the method comprising:
  obtaining, by a processing circuitry:
  (A) a machine learning model capable of receiving an image of an ID, and determining if the ID was issued as a cryptographically signed ID, wherein the machine learning model is trained utilizing a training-data set comprising of a plurality of training records, each training record comprising: (i) a training image, and (ii) a training label indicating if the training image includes an ID that was issued as a cryptographically signed ID or not; and
  (B) a given image of a given ID;
  determining, by the processing circuitry, using the machine learning model and the given image, if the given ID was issued as a cryptographically signed ID or not; and upon determining that the given ID was issued as a cryptographically signed ID, employing, by the processing circuitry, one or more verification modules on the given image to determine validity of the given ID.

\* \* \* \* \*